United States Patent [19]
Hart et al.

[11] Patent Number: 5,694,494
[45] Date of Patent: Dec. 2, 1997

[54] ELECTRONIC RETRIEVAL OF INFORMATION FROM FORM DOCUMENTS

[75] Inventors: Peter Hart; Mark Peairs, both of Menlo Park, Calif.; Mitsutoshi Mizutani, Tokyo, Japan

[73] Assignees: Ricoh Company, Ltd., Tokyo, Japan; Ricoh Corporation, Menlo Park, Calif.

[21] Appl. No.: 712,663

[22] Filed: Sep. 13, 1996

Related U.S. Application Data

[63] Continuation of Ser. No. 294,418, Aug. 23, 1994, abandoned, which is a continuation-in-part of Ser. No. 45,954, Apr. 12, 1993, abandoned.

[51] Int. Cl.$^6$ ................................................ G06K 9/00
[52] U.S. Cl. ........................................ 382/305; 382/175
[58] Field of Search ........................... 382/163, 175, 382/176, 305, 306, 257, 254; 358/464, 462, 447, 453, 455

[56] References Cited

U.S. PATENT DOCUMENTS

| | | | |
|---|---|---|---|
| 4,298,895 | 11/1981 | Arai et al. | 382/54 |
| 4,601,056 | 7/1986 | Habitzreiter et al. | 382/50 |
| 4,866,785 | 9/1989 | Shibano | 382/51 |
| 4,979,136 | 12/1990 | Weiman et al. | 382/54 |
| 5,017,763 | 5/1991 | Shepard | 382/175 |
| 5,115,475 | 5/1992 | Lebeau | 382/257 |
| 5,140,650 | 8/1992 | Casey et al. | 382/61 |
| 5,214,470 | 5/1993 | Denber | 382/54 |
| 5,229,589 | 7/1993 | Schneider | 235/456 |
| 5,237,628 | 8/1993 | Levitan | 382/175 |

OTHER PUBLICATIONS

Sezan, M.I., et al, "Survey of Recent Developments in Digital Image Restoration," Optical Engineering (May 1990) 29(5): 393–404.

Doherty, E., An Introduction to Morphological Image Processing, SPIE Optical Engineering Press, Bellingham, Washington 1992.

*Primary Examiner*—Yon J. Couso
*Attorney, Agent, or Firm*—Townsend and Townsend and Crew LLP

[57] ABSTRACT

A method for retrieving user-supplied information from a scanned version of a completed document is described. The method includes the steps of obtaining a first image of the document having information printed thereon in its blank format before other information has been added to it by the user. A second image of the document is obtained after information has been added to it by the user. The two images are aligned, and for each pixel in the first image which corresponds to information on the document, those pixels are deleted from the second image to create an image which corresponds to subtraction of the first image from the second image. Finally, a step is performed to electronically restore the information added by the user which was deleted during the subtraction operation.

25 Claims, 9 Drawing Sheets

FIG. 1.

| | GROUP NO. | BILLING UNIT NO. | CLAIM CAT. (if any) | SOCIAL SECURITY NO | EMPL |
|---|---|---|---|---|---|
| 1 | 27 | 10-624 | | 329-6404 | R |
| | COPY FROM YOUR I.D. CARD | | | | |
| | NAME OF EMPLOYEE | | | [ ] MARRIED [ ] WIDOW | |
| 2 | Huckleberry Finn | | | [X] SINGLE [ ] DIVOR | |
| | ADDRESS OF EMPLOYEE: NO. & STREET | | | CITY | |
| 3 | 3209 MORRIS DR | | | PALO ALTO | |
| | TELEPHONE NO. | | | DATE YOU LAST WORKED | |
| 4 | 415-572-6404 | | | 3/4/1899 | |

27    10-624    329-6404  R
Huckleberry Finn  X
3209 MORRIS DR  PALO ALTO
415-572-6404  3/4/1899

27    10-624    329-6404  R
Huckleberry Finn  X
3209 MORRIS DR  PALO ALTO
415-572-6404  3/4/1899

*FIG. 6.*

ELECTRONIC RETRIEVAL OF INFORMATION FROM FORM DOCUMENTS

CROSS REFERENCE TO RELATED APPLICATION

This is a Continuation of application Ser. No. 08/294,418, filed Aug. 23, 1994, now abandoned, which is a continuation-in-part of U.S. patent application Ser. No. 08/045,954, filed Apr. 12, 1993, entitled "Restoration of Images with Undefined Pixel Values," now abandoned.

BACKGROUND OF THE INVENTION

This invention relates to a method and apparatus for retrieving information from the scanned version of a completed form. In particular, the invention relates to a technique for electronically obtaining the information placed on a form document and distinguishing that information from the form document itself.

A common problem in conventional document processing is the retrieval of information from form type documents. Form documents are typically preprinted sheets of paper having blanks or open areas thereon where information is to be supplied by an individual completing the form. The form may pass through the hands of several individuals, each of whom adds additional information, before it is to be processed by someone expected to act based upon the information supplied on the form. That person typically interprets the information added to the form in conjunction with the preprinted aspects of the form to make a decision, or take a particular action. Forms such as described are well known, and include purchase orders, shipping documents, employment records, insurance records, etc.

To facilitate the handling of such forms, and the retrieval of information from them, it is desirable to be able to separate the information added to the form from the information which was previously printed on the form. For example, it is desirable to obtain the information contained in the name and address of the individual completing the form, and distinguish that information from the blanks listing name, address, city, etc. If the form is scanned, for example using a well known document scanner, the information preprinted on the form is detected in addition to the information added to the form. Using optical character recognition, or other similar technologies, it is still extremely difficult to separate the two types of information so that only the information added to the form may be employed in subsequent document processing operations.

One prior art solution to the problem has been to employ a particular printing color for the form and a matched color filter for scanning the form after it has been completed. In such situations, a different color ink is employed to complete the form from that used to print it.

During scanning of the completed form, a matched color filter is employed to block the form document from the scanner, enabling the scanner to only detect the information added to the form. Although this technique is functional, it is severely limited because form suppliers, or businesses employing forms, with to provide a large variety of forms, requiring a corresponding large variety of color filters.

Another prior art approach has been to use document processing technology to separate answers, such as answers to test questions on a standardized test form, from the underlying document itself. One example of this technology is U.S. Pat. No. 5,229,589 which describes scanning completed questionnaires and subtracting from the completed questionnaire the image of a blank questionnaire to detect the added information. Unfortunately, such a technique deletes any of the added information coinciding with the original blank questionnaire. This typically precludes the use of handwriting recognition, optical character recognition, or other tools to interpret the content of the added information.

Another prior art approach to retrieval of information from forms is described in U.S. Pat. No. 5,140,650. In that patent a system is described in which a blank form and a completed form are each scanned. The image of the blank form is compared to that of the completed form. Mask regions are then defined to extract the data. The data is then analyzed by optical character recognition. Unfortunately, this system can result in errors because the form removal step does not always remove all of the form in regions where data are present, making the resulting analysis subject to errors.

SUMMARY OF THE INVENTION

We have developed a technique employing electronic image processing which enables the information added to a form to be electronically separated from the information contained in the form itself. Our technique does not require special color filters, unique forms, or otherwise restrict the forms supplier or the business employing the forms in any way. According to our method and apparatus, an empty version of the form is scanned, together with a completed version of the form. By approximately alignment of the two documents, the pixels representing the form may be "subtracted" from the image of the completed form, leaving an image of only the material added to the form. Then, using an image restoration process we have developed, the resulting image is processed to restore essentially all of the information added to the form. Conventional handwriting recognition techniques, optical character recognition, or other technology may be employed to use the information resulting from our process in other apparatus.

In a preferred embodiment, our method of electronically retrieving information added to a document or form includes the steps of obtaining a first image of the document having information printed thereon in its blank format before other information has been added by the use. A second image of the document is obtained after information has been added to it by the user. After the two images are obtained, for each region in the first image which corresponds to information on the document, that region is deleted from the second image to thereby create an image corresponding to subtraction of the first image from the second image. Finally, we employ a technique to electronically restore the information added by the user which was deleted by the step of deleting pixels above.

Preferably, the first and second images are obtained electronically by scanning the document. The two images are then aligned, and the image of the blank form is subtracted from the image of the completed form. During this process, it is likely that some information added by the user will also be deleted. To restore that image we apply an image continuation technique before the subsequent processing of the user-added information occurs.

BRIEF DESCRIPTION OF THE DRAWINGS

FIG. 1 is an illustration of a typical blank form;

FIG. 6 is an enlarged portion of detail from another part of the form illustrating the combined form and user-added information, the deletion of the form the combined image, and the use of the image restoration technique;

DESCRIPTION OF THE SPECIFIC EMBODIMENTS

Our invention is directed toward the problem of retrieving information added by a user to a form, and distinguishing that information from the information content of the form itself. Below we describe the overall operation of our system, then explain in additional detail the particular implementation employed.

Figure 1:
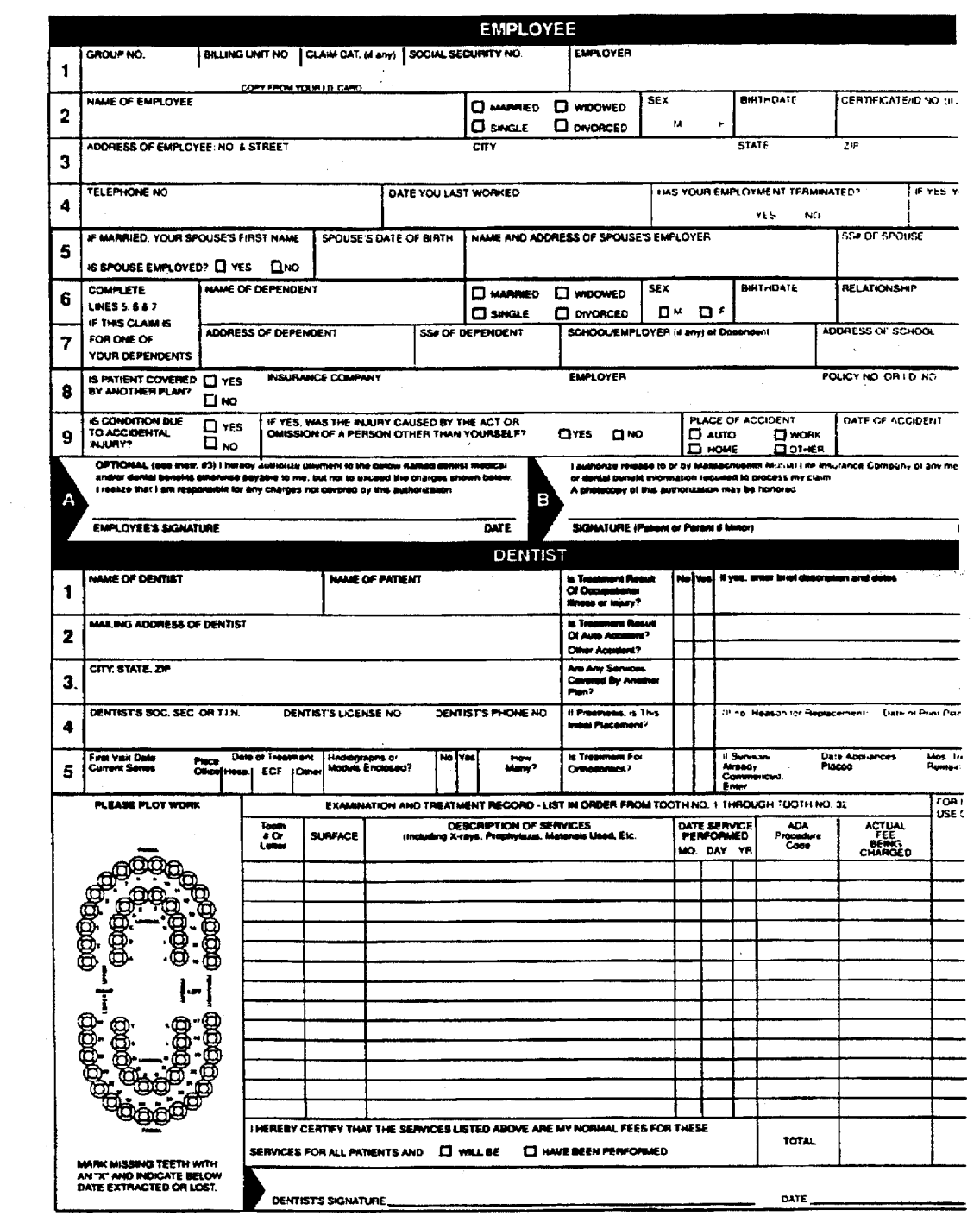

FIG. 1 is an illustration of a form. The form shown in FIG. 1 is typical in the sense that it includes a variety of printed regions providing instructions to a user for completion of the form. In the case of the form shown in FIG. 1, more than one user will ultimately supply information to the form, then the form will be transmitted to some other location where document processing is to occur. In processing the document, it is desired to retrieve the information added by the user to the form, so that the retrieved information can be used. Because optical character recognition or other techniques for processing the completed form will retrieve all of the information on the form, including the instructions to the user for completing the form, it is desirable to remove the instructions before processing of the information added by the user. Removal of the instructions, lines, etc., from the form enables the resulting information to be processed in terms of its information content, rather than as merely an image. Herein, we employ the terms "blank form," "document in blank format," and the like to describe the information content of the document prior to the addition of user information.

Figure 2:
FIG. 2 is an illustration of the same form after being completed by a user.

FIG. 2 illustrates the document shown in FIG. 1 after it has been partially completed by one or more users. As shown in FIG. 2, information has been added to the form relating to the identification of the individual involved, and the treatment employed. We refer to the information shown in FIG. 2 as the "completed form," or the document after information has been added to it by the user.

Although we describe our invention herein in the context of a form which is to be completed, it should be appreciated that the invention will have applicability to any circumstance in which the differences between two documents are to be electronically detected and processed in any desired manner. For example, annotations made to any type of document can be considered equivalent to the addition of information to a document by a user. Thus, the invention has applicability to determining changes between two versions of the same document and the like, so long as a reference copy of the original document is available.

In the preferred embodiment of our invention shown in FIGS. 1 and 2, that is of the document before and after addition of information, images of the form are obtained electronically. Preferably, an optical scanner of well known design is employed. Such scanners are commercially available, for example from Ricoh Corporation, assignee of the present invention. Typically, such scanners employ charge-coupled devices or similar sensors to obtain digitized images of the document scanned.

After the two images have been obtained and stored electronically, they are available for subsequent processing according to our invention.

In one embodiment of our invention, the information on the blank form is "dilated" to increase the number of pixels corresponding to the information content of the form. During this dilation the black regions, which represent the information content of the form, are expanded relative to the white portions. For example, one of the horizontal lines on the form which occupies a single row of pixels may be increased in size to occupy three rows of pixels. Dilation of the information content of the form may be achieved using any well known technique. The general purpose of the dilation is to create a version of the empty form and use that as the set of pixels to be removed from a filled-in form. In dilation, the dark regions, which provide the information content of the form, are "grown" into the whim regions by a desired amount to increase the size of the dark regions. By increasing the size of the dark regions, when the blank document is subtracted from the completed document, a higher degree of certainty is provided that all of the information content of the blank document has been removed from the completed document. In embodiments of the invention employing simple documents, or simple additions by the user, the step of dilating the document in its blank format need not be employed.

Figure 3:
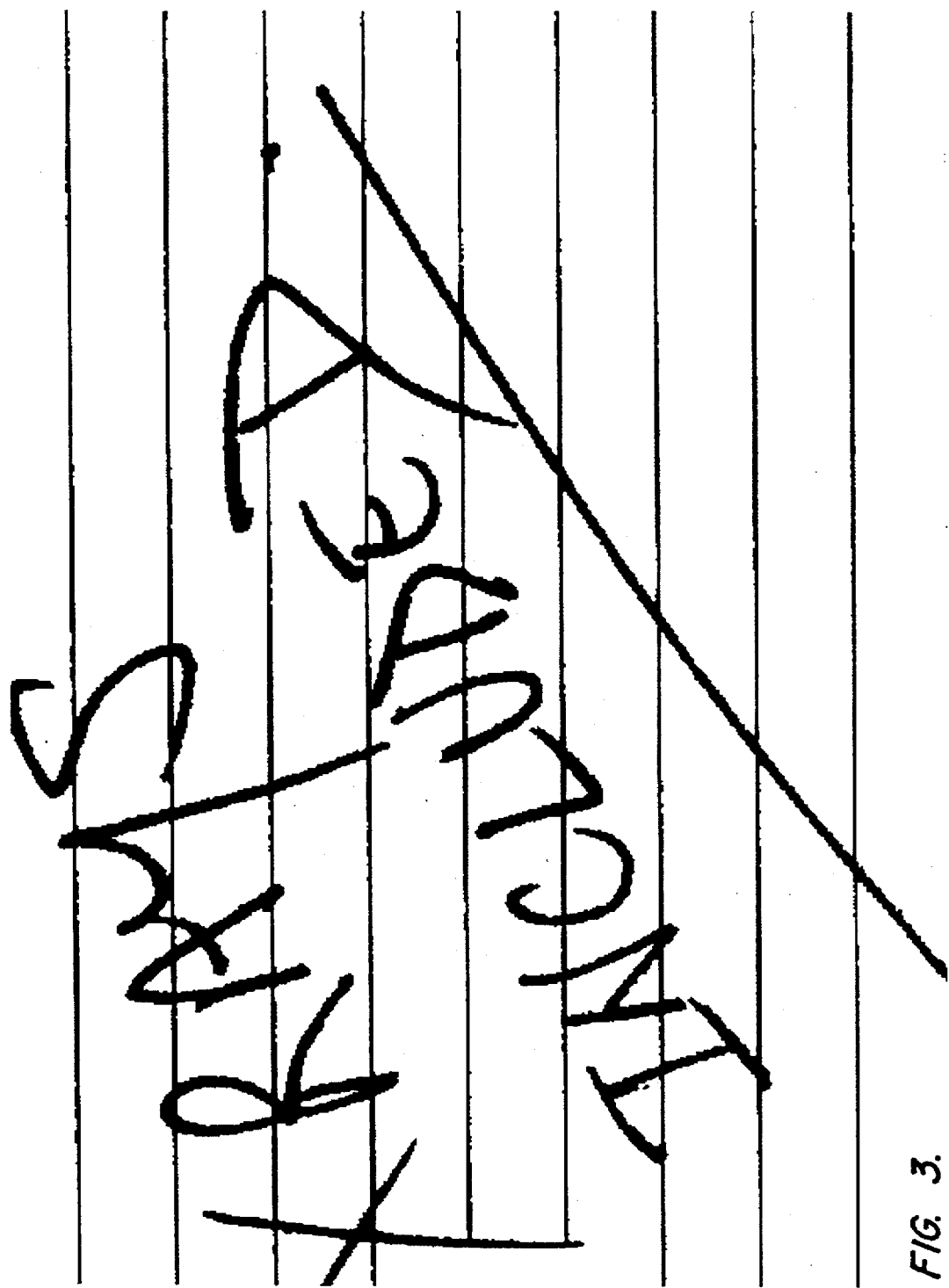
FIG. 3 is an expanded view of a portion of FIG. 2 illustrating the information content of the form and the user-added information.

FIG. 3 is an expanded view of a small portion of the document shown in FIG. 2. FIG. 3 is used to explain the operation of our invention in more detail, although it should be understood that the entire document will preferably be processed, not just a small portion such as is shown in FIG. 3. As shown in FIG. 3, the image of the completed document which is to be processed will include overlapping portions of the information added by the user and the underlying portions of the original document itself.

Figure 4:
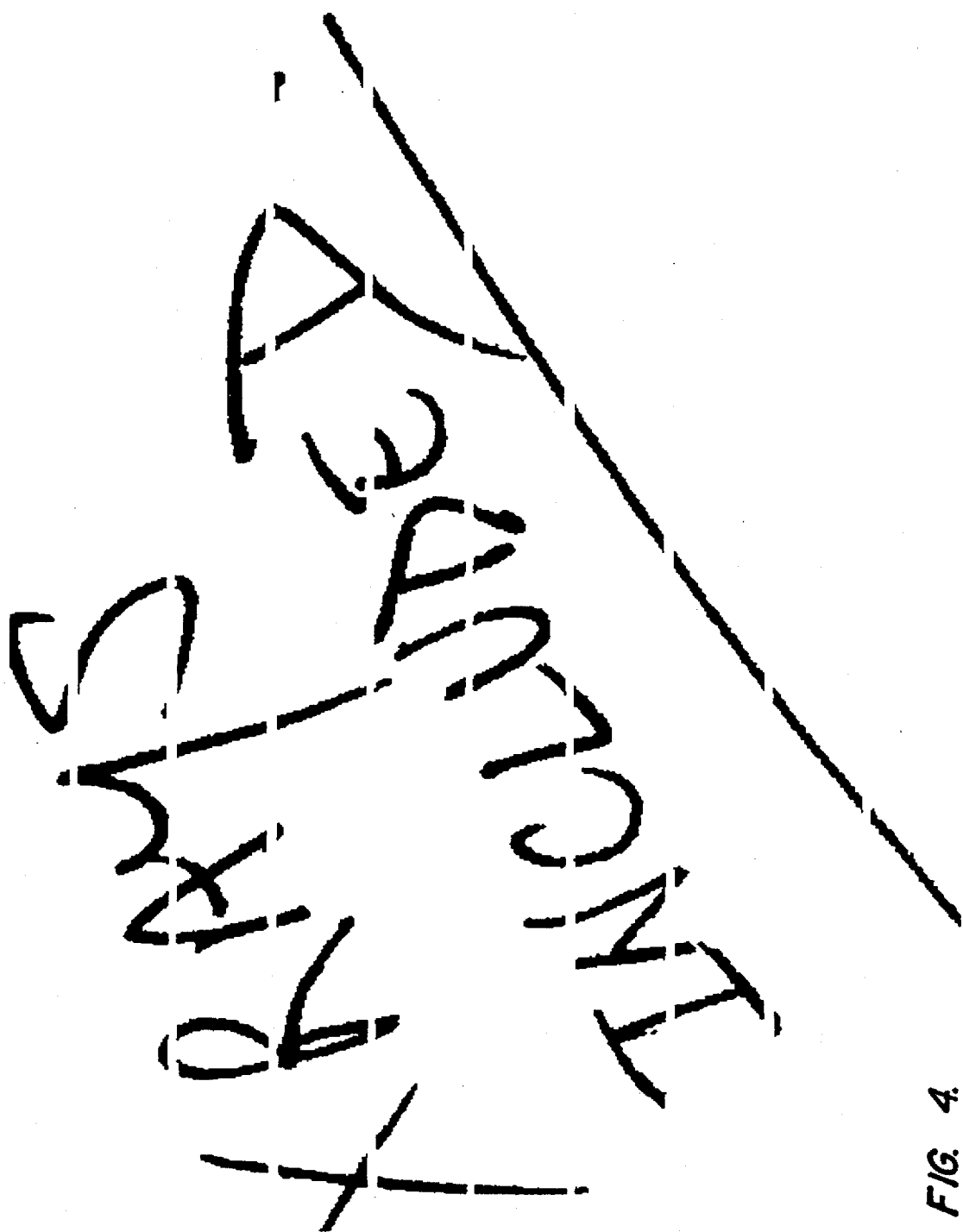
FIG. 4 illustrates the appearance of the information added by the user after subtraction of the information in FIG. 1 from the information in FIG. 2.

Next, as shown by FIG. 4, the image of the blank document, either dilated or undilated, is removed from the image of the completed document. Preferably, this is achieved by comparing the two images with each other to align them, and then subtracting the image of the blank form, again either dilated or undilated, from the image of the completed form. The step of aligning the two forms can be achieved using conventional pattern matching algorithms or techniques, for example, by adding alignment marks to the form when it is printed, or preferably by using features of the images themselves as alignment marks. In FIG. 4, note that the portions deleted are slightly larger in size than the original corresponding portions of the form itself, indicating that the horizontal lines were dilated slightly before being subtracted from the image.

Once the blank document has been subtracted, it is desirable to restore as much as possible of the user-supplied information. Much of the optical character recognition technology relies upon continuity in the information content to "recognize" the characters. For example, the OCR can interpret two diagonal crossing strokes as an "X," but it may not correctly identify a five-segment stroke overlapping a two-segment stroke (as shown in FIG. 4) as an "X." Processing the image of FIG. 4 with conventional optical character recognition equipment typically would result in numerous errors in interpretation. Accordingly, we employ a technique we term "image continuation" to restore the deleted information from the image.

Our technique for restoring the image relies upon the knowledge that there are fixed regions of image data where the pixel values are known, and other regions fixed regions of image data where the pixel values are unknown. For example, in FIG. 4 the dark regions are all known pixels whereas the white regions have both known and unknown pixel values. That is, for the regions where the original horizontal lines were removed, it is not known whether the pixel values were black or white. (In regions of the letters, the user supplied information, while in regions between the letters, the user did not supply information.) We use "drop out areas" to describe areas in which the pixel values are unknown, emphasizing that the values are unknown, not incorrect.

In our method of image continuation, a threshold value and a neighborhood configuration are specified as initial conditions for the operation of the method performed electronically. A neighborhood configuration defines a geometric region, typically of a fixed number of pixels, and usually surrounding a target pixel to be restored. The threshold value specifies the number of pixels in the neighborhood configuration whose values must be known. In our method, for each pixel in one of the drop out regions, an analysis is performed over the entire region defined by the neighborhood. Within that region the number of pixels which are not drop out pixels are counted. If the count exceeds the threshold value, then a value for the unknown pixel is calculated. In our preferred embodiment, the calculation consists of averaging the values of the pixels in the neighborhood configuration. In another embodiment the calculation is weighted to favor dark pixels over light pixels. For example, if the average is greater than 0.33 black (and less than 0.67 white), black will be chosen. The steps of analyzing unknown pixels and computing values continues until no unknown pixels remain which satisfy the criterion of having neighboring pixels exceeding the threshold value.

Next, according to our technique, the computed pixel values are returned to the undefined region, thereby reducing its size and adding to the set of pixels having known values. Then the steps of analyzing pixels with unknown values and comparing the results against a threshold value is repeated. This process continues until a small number (or zero) of unknown pixels satisfy the threshold criterion. Then the threshold is decremented and the entire process repeated. Using this technique, eventually all unknown pixels will be converted to known pixels, and the image restored. For further discussion of the method and apparatus of our method of image continuation, please see the United States patent application referred to above.

Figure 5:
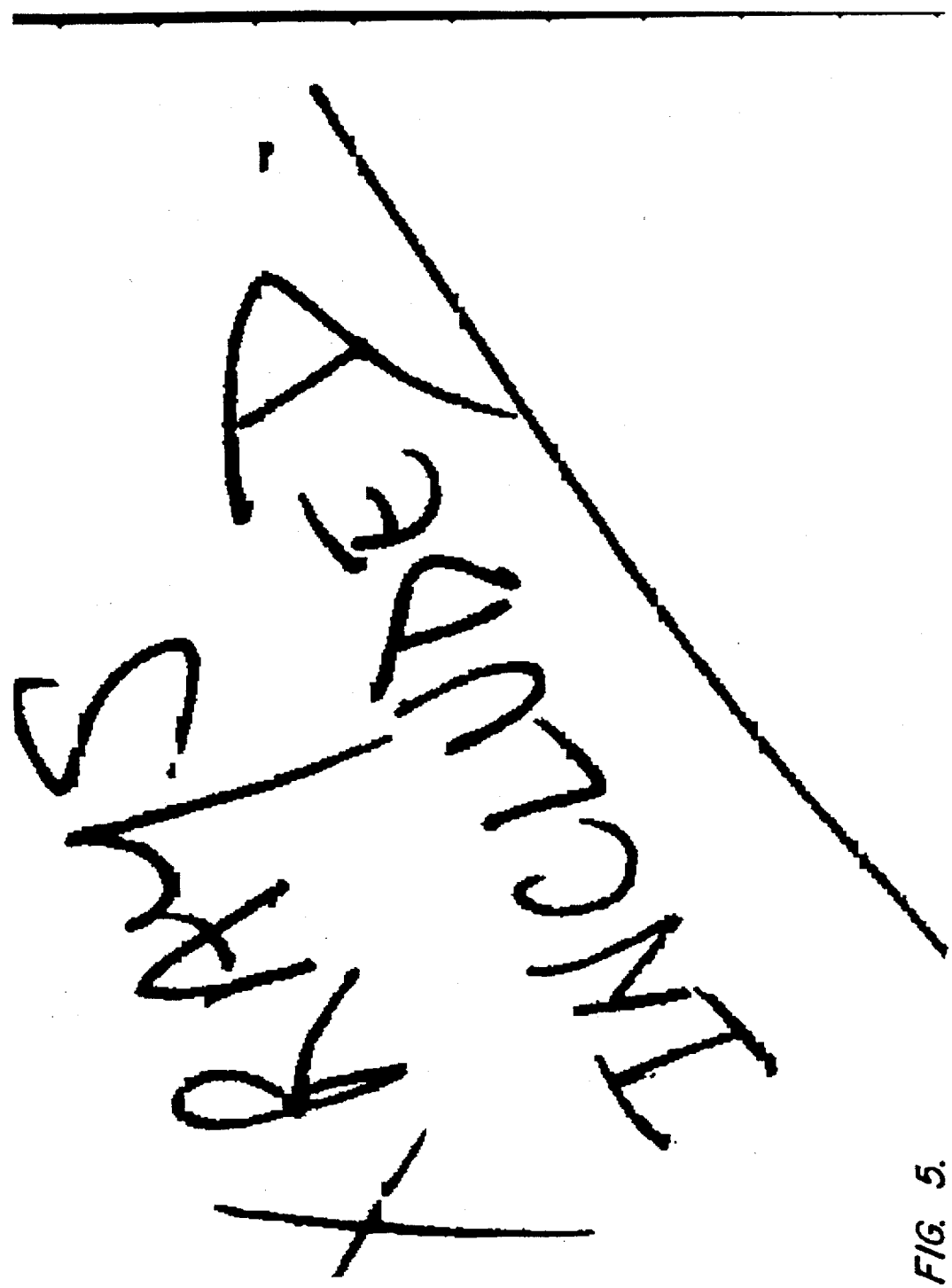
FIG. 5 illustrates the appearance of the information added by the user after the image has been restored.

Once our technique of image continuation has been applied to the image of FIG. 4, the missing pixels are restored, creating the image shown in FIG. 5. In FIG. 5, the image continuation algorithm has generally restored the original shape of all of the characters, with slight flaws in one stroke of the "X" and near the bottom of the stroke of the "S."

FIG. 6 is an enlarged view of another portion of the document shown in FIG. 2. FIG. 6, however, includes in its upper portion the completed form, and in its middle portion the result of the subtraction of the blank document from the completed document. In the lower portion of FIG. 6, the image restoration techniques have been applied to restore the pixels deleted during the subtraction operation. This has restored continuity to the "X" through the "single" box, the lower portion of the "Y" in the name, and the upper portion of the area code in the telephone number.

Figure 7:
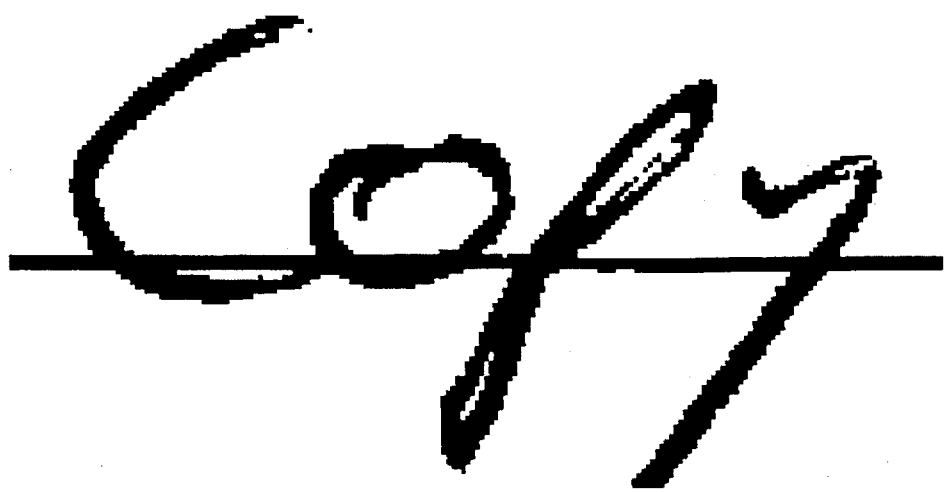
FIG. 7 illustrates an enlarged portion of another form.
Figure 8:
FIG. 8 illustrates the same information after deletion of the form.
Figure 9:
FIG. 9 illustrates the use of one image continuation technique for restoring some of the user-added information.

FIG. 7 is a highly magnified portion of a completed document wherein the word "copy" has been handwritten onto a line in a form. FIG. 8 illustrates the image after subtraction of the form from the completed image. FIG. 9 illustrates the image of FIG. 8 after restoration in which black and white pixels are given equal weight.

Figure 10:
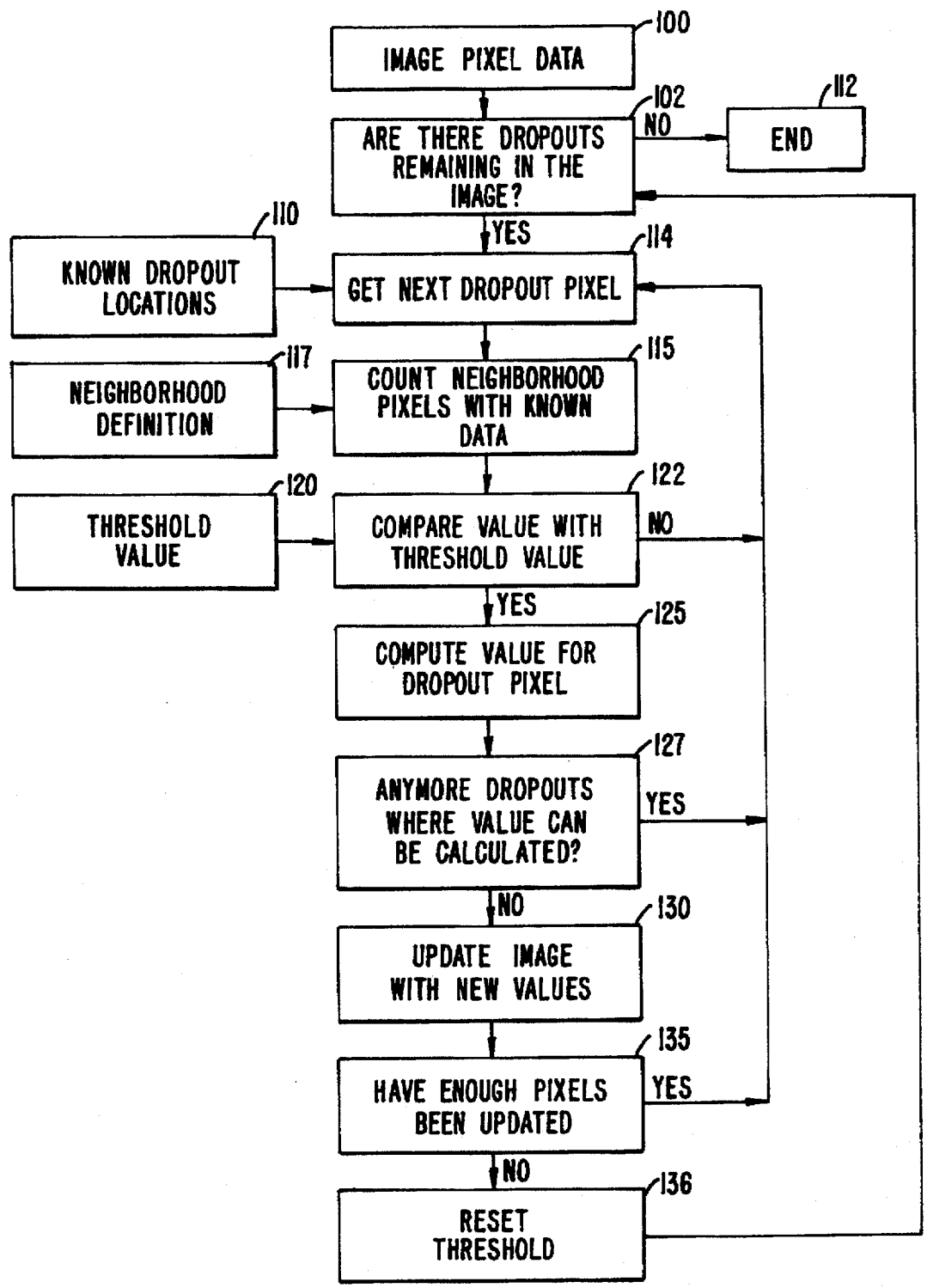
FIG. 10 is a flowchart illustrating a preferred embodiment of the image restoration step of our invention.

FIG. 10 is a flowchart taken from our above-referenced U.S. patent application. The method relies upon image pixel data 100 having known dropout locations 110. As discussed, the dropout locations are locations in the image pixel data for which the pixel values are undefined or unknown. In the case of retrieving information from the completed form, the dropout locations correspond to the original blank form black pixels. In the preferred embodiment, at the beginning of the process the image pixel data is analyzed to determine if there are any dropout pixels remaining in the image. This is accomplished by maintaining a record of the number and location of dropout pixels. When the number reaches zero (or an otherwise defined acceptably small number), the procedure ends at 112, and the process is complete.

If there are dropout pixels remaining in the image, the location of the next dropout pixel location is retrieved at step 114. At step 115 a count is made of the neighborhood pixels with known dam. The neighborhood pixels are those pixels in the immediate vicinity of the dropout pixel. In the preferred embodiment, the neighborhood pixels consist of the 8 pixels surrounding the single pixel selected as the dropout pixel. These 8 pixels consist of the 3 pixels in the row above the dropout pixel, the 3 pixels in the row below the dropout pixel, and a single pixel to the left and right of the dropout pixel.

It should be appreciated that this particular neighborhood arrangement is arbitrary. The neighborhood definition 117 is an initial parameter supplied to our system, and can be chosen to optimize the performance of the system for different types and qualities of images. For example, in other types of images a bulls eye pattern may be employed, a larger area pattern, or some other pattern selected. For unusual images the neighborhood might even be defined using pixels not in the vicinity of the dropout pixel being processed. Once the count of neighborhood pixels with known data is complete, the count is compared with the threshold value 120 at step 122.

The threshold value 120 is also an initial condition for the operation of our system. Typically, the threshold value is selected to be a number which corresponds to the number of pixels in the neighborhood which must have known values. In one embodiment this is 7 of the 8 pixels neighborhood pixels. The use of 7 of a neighborhood of 8 provides a high level of quality in the resulting image. For faster operation, lower threshold values may be selected, as will be discussed.

If there are not enough neighborhood pixels with known data to meet the threshold, the flow of the process returns to step 114 for selection of the next dropout pixel. On the other hand, if enough pixels are present having values to satisfy the threshold 120, then a new value is computed for the dropout pixel as shown by step 125. This new value can be computed by using any suitable technique. For example, using either the average of the surrounding pixels, or their mean, has been found satisfactory. In the alternative embodiment mentioned above, for some document analysis one color may be preferred over another. If so, the threshold for one color may be set differently than for another color, giving it an increased likelihood of determining the unknown pixel. Of course, other techniques involving weighted averages or more complicated mathematical operations, such as statistical correlations, and larger comparison areas may also be employed.

Once the value of the dropout pixel is computed at step 125, a determination is made at step 127 about whether any more dropout pixels have values which can be calculated. If there are, then the next dropout pixel is obtained and flow of the process returns to step 114. If there are no more dropout pixels whose value can be calculated, the process continues to step 130. It should be understood that at this stage of the process a large number of dropout pixels may remain, but simply none of them have a sufficient number of surrounding pixels with known values to satisfy the threshold.

Assuming that there are no further dropout pixels whose value can be calculated, the image is updated with the new values. In other words, the formerly unknown pixels which now have calculated values are added back into the image as known pixels using the calculated values. This expands the set of "known" pixels and reduces the set of dropout pixels.

Next, as shown by step 135, a determination is made about whether "enough" dropout pixels have been updated. "Enough" can be any desired number, percentage, or other measure of pixels. The goal of this step 135 is to lessen the number of iterations of the system. For example, if each iteration through the preceding steps 114-130 is only computing a new value for one, two or a few pixels, the process can be carried out more efficiently by resetting the threshold. If enough (a large number) pixels were updated, flow of the process returns to step 114 for processing of the next pixel.

On the other hand, if only a small number of pixels were updated, as shown by the test 135, the threshold value can be reset at step 136 to expedite subsequent processing. Control then returns to step 102 for the next iteration. If no dropout pixels remain, the process ends at step 112.

In summary, the method described in FIG. 10 uses known information from the image and known information about the location of the defects. For each member of the dropout set of pixels, members of a local neighborhood in the image are considered. If enough neighborhood information is known, then the dropout location is marked and a value is saved for that location. After successive passes through the set of dropout locations, the image can be updated with the values of the marked locations, and then those same locations removed from the dropout set. This provides additional numbers of known pixels for subsequent processing. Once the process reaches a small enough set of dropout pixels, the threshold may be shifted as necessary, ultimately terminating when all dropout locations have received values. Although in the preferred embodiment the process terminates when all of the dropout pixels have been restored, it should be appreciated that not all need to be restored. In applications involving images where all pixel values are not required, fewer than all can be restored to expedite the process.

Because of the arbitrary nature of the source image, our approach makes no assumptions about the content of the original information. All necessary information is at the pixel level.

Figure 11:
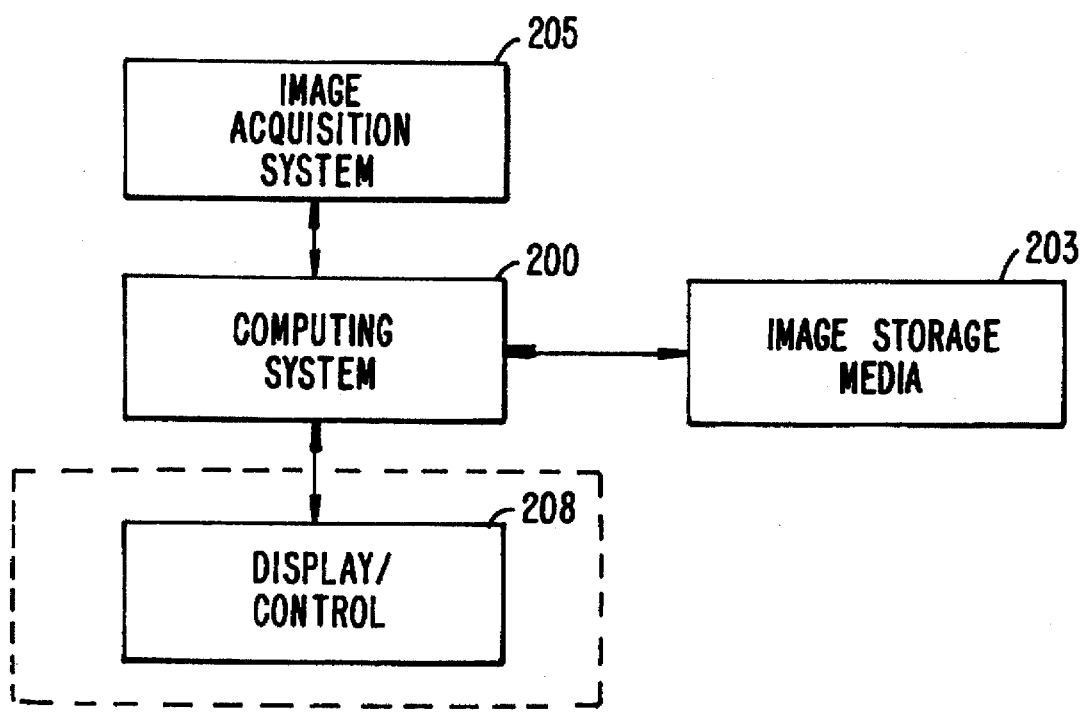
FIG. 11 is a block diagram illustrating a preferred embodiment of the system of our invention.

FIG. 11 is a block diagram illustrating a preferred embodiment of the system for carrying out our invention. As shown in FIG. 12, the system includes a computer system 200. This system can comprise any well known computing system including a workstation, a personal computer, or a special purpose image processing computer. The computing system is coupled to a desired form of media 203 for storing, at least temporarily, image information. Media 203 typically will include well known semiconductor memory, hard disk storage, tape storage, or other forms of digital storage.

Also coupled to computing system 200 is an image acquisition system 205. The image acquisition system 205 preferably includes a well known system for acquiring images and converting them into arrays of digital pixel values. For example, the image acquisition system can comprise a scanner, a facsimile machine, a photocopy machine, etc. No particular characteristics are required of the image acquisition system, other than it be capable of processing analog image into digital information.

Finally, coupled to computing system, and often included as a part thereof, is a form of display and control means 208. The display and control means 208 can include a keyboard, a monitor, or some other system for controlling the operation of the computing system. This aspect of the system may be hidden from the user in embedded or automatic control systems. In view of its optional nature, a dashed box encircles display and control means 208.

In operation the image of the blank and completed form is obtained by acquisition system 205 and stored in media 203. The computing system then, using the method of FIG. 11, Subtracts one image from the other and restores the resulting image.

The foregoing has been a description of the preferred embodiment of our system. It should be understood that the techniques we have developed are broadly applicable to a wide range of forms, documents, images and equipment. The scope of the invention is defined by the appended claims.

What is claimed is:

1. A method of electronically distinguishing information added to a form document from the form document itself, and of retrieving the information from said form document, the method comprising the steps of:

obtaining a first digital image of a form document to produce a first array of pixels representing printed areas of said form document, wherein each pixel of said first array of pixels has a pixel location and a pixel value;

obtaining a second digital image of said form document having information added thereto to produce a second array of pixels representing printed areas of said form document and added information, wherein each pixel in said second array of pixels has a pixel location and a pixel value;

identifying a subset of pixels in said second array which correspond to said first array of pixels by aligning the pixel locations of said first array of pixels with said second array of pixels;

deleting the pixel value of each pixel in said subset of pixels, irrespective of whether any of said subset of pixels also correspond to said added information;

designating as "unknown" the pixel value of those pixels whose pixel values were deleted in said deleting step, thereby producing a set of dropout pixels; and estimating a pixel value for one or more pixels in said set of dropout pixels to produce a third digital image representing said added information apart from said form document itself.

2. A method as in claim 1 wherein the step of estimating a pixel value for one or more pixels in said set of dropout pixels comprises the steps of:

(a) specifying a neighborhood configuration and a threshold value;

(b) selecting a dropout pixel from said set of dropout pixels;

(c) counting a number of neighborhood pixels having a known pixel value, said neighborhood pixels being in a neighborhood region relative to said dropout pixel as defined by said neighborhood configuration;

(d) calculating a pixel value for said dropout pixel when said number of neighborhood pixels having a known pixel value exceeds said threshold value;

(e) selecting another dropout pixel from said set of dropout pixels;

(f) repeating steps (c) through (e) until there are no pixels remaining in said set of dropout pixels having a number of neighborhood pixels of known value which exceeds said threshold value; and (g) adjusting said threshold value, when desired, and repeating steps (c) through (f) until a number of pixels in said set of dropout pixels having a pixel value of "unknown" is less than a desired quantity.

3. A method as in claim 2 wherein the neighborhood configuration comprises a geometrical region immediately adjacent to and encompassing said dropout pixel.

4. A method as in claim 2 wherein the threshold value is a number smaller than the number of pixels encompassed by said neighborhood region.

5. A method as in claim 2 wherein the step of calculating a pixel value for said dropout pixel comprises a step of performing a mathematical operation on the pixel values of those pixels in the neighborhood region having a known pixel value.

6. A method as in claim 2 wherein the pixels are arranged in a matrix and the neighborhood configuration comprises a 3×3 pixel matrix surrounding said dropout pixel.

7. A method as in claim 2 wherein step (g) further includes the step of decrementing the threshold value by one.

8. A method as in claim 1 further comprising a step of applying a dilation filter to the first array of pixels to produce an expanded first array of pixels having an increased number of pixels for representing printed areas of said form document.

9. A method as in claim 1 wherein the step of obtaining a second digital image further comprises electronically scanning the form document having information added thereto to obtain a second stored image thereof.

10. A method as in claim 9 wherein the step of obtaining a first digital image further comprises scanning the form document to obtain a first stored image thereof.

11. A method as in claim 10 further comprising a step of dilating said first array of pixels before said step of aligning.

12. A method for restoring pixels in an image represented by pixels having known pixel values and pixels to be restored having unknown pixel values, the method comprising the steps of:

(a) obtaining, external to the image, an indication of which pixels have unknown pixel values;

(b) specifying a threshold value and a neighborhood configuration, the neighborhood configuration defining a windows;

(c) restoring each pixel having an unknown pixel value, by the steps of:

(1) positioning the window relative to the pixel to be restored;

(2) counting a number of pixels having known values in the window to obtain a known pixel count;

(3) calculating, when the known pixel count exceeds the threshold value, a restored pixel value, said restored pixel value being a function of the pixel values of the pixels in the window having known pixel values;

(4) assigning, when the known pixel count exceeds the threshold value, the restored pixel value to the pixel to be restored; and (5) repeating steps (1)–(4) until there are no pixels having unknown values remaining whose known pixel count exceeds the threshold value; and (d) adjusting the threshold value, when desired, and repeating step (c) above until a number of pixels having unknown values is less than a desired quantity.

13. A method as in claim 12 wherein the step of calculating a restored pixel value comprises a step of calculating an average of the pixel values of the pixels in the window having known pixel values.

14. A method as in claim 12 wherein the step of calculating a restored pixel value comprises a step of calculating a weighted average of the pixel values of the pixels in the window having known pixel values.

15. A method as in claim 12 wherein the step of calculating a restored pixel value comprises a step of calculating a rounded value of a weighted average of the pixel values of the pixels in the window having known pixel values.

16. A method as in claim 12 wherein the neighborhood configuration comprises a geometrical region immediately adjacent to and encompassing the pixel to be restored.

17. A method as in claim 12 wherein the threshold value is a number smaller than the number of pixels in the window.

18. A method as in claim 12 wherein the pixels are arranged in a matrix and the neighborhood configuration comprises a 3×3 pixel matrix surrounding said pixel to be restored.

19. A method as in claim 18 wherein the threshold value is 7.

20. A method as in claim 12 wherein step (d) further includes the step of decrementing the threshold value by one.

21. A method as in claim 12 wherein the step of specifying a threshold value includes a step of specifying a threshold value dependent on the pixel values of pixels in the window.

22. A method as in claim 12 wherein the desired quantity is zero.

23. A computing system for restoring pixels in an image represented by pixels having known pixel values and pixels to be restored having unknown pixel values, the system comprising:

(a) means for obtaining, external to the image, an indication of which pixels have unknown pixel values;

(b) means for specifying a threshold value, a neighborhood configuration and a desired quantity of unrestored pixels, wherein the neighborhood configuration defines a window;

(c) means, coupled to said means for obtaining and said means for specifying, for restoring each pixel having an unknown pixel value, including:

(1) means for positioning the window relative to the pixel to be restored;

(2) means for counting a number of pixels having known values in the window to obtain a known pixel count;

(3) means for comparing the known pixel count to said threshold value;

(4) means, coupled to the means for comparing the known pixel count, for calculating a restored pixel value when the known pixel value exceeds said threshold value, wherein the restored pixel value is calculated as a function of the pixel values of the pixels in the window having known pixel values;

(4) means, coupled to the means for comparing, assigning the restored pixel value to the pixel to be restored when the known pixel count exceeds the threshold value; and (5) means for determining when no pixels having unknown values whose known pixel count exceeds the threshold value remain;

(6) means, coupled to said means for determining, for repeating the operation of the means for positioning, the means for counting, the means for comparing, the means for calculating, the means for assigning, and the means for determining, until no pixels having unknown values whose known pixel count exceeds the threshold value remain;

(d) means for comparing a number of unrestored pixels having an unknown value to the desired quantity of unrestored pixels; and (e) means, coupled to the means for comparing a number of unrestored pixels and the means for restoring, for selectively adjusting the threshold value, and for repeating the operation of the means for restoring until the number of pixels having unknown values is less than the desired quantity of unrestored pixels.

24. A computing system as in claim 23 wherein the means for obtaining an indication is a means for reading a digitized image of a blank form, the pixels in the digitized image of an obscuring value being the indicated pixels.

25. A computing system as in claim 23 wherein the means for obtaining an indication includes dilation means for dilating the blank form, thereby increasing the number of pixels indicated.

* * * * *